United States Patent
Tekinay et al.

(10) Patent No.: US 7,215,281 B2
(45) Date of Patent: May 8, 2007

(54) WIRELESS NETWORK ASSISTED GPS SYSTEM

(75) Inventors: Sirin Tekinay, New York, NY (US); Woo-Jin Choi, Seoul (KR)

(73) Assignee: New Jersey Institute of Technology, Newark, NJ (US)

( * ) Notice: Subject to any disclaimer, the term of this patent is extended or adjusted under 35 U.S.C. 154(b) by 34 days.

(21) Appl. No.: 10/827,911

(22) Filed: Apr. 20, 2004

(65) Prior Publication Data

US 2005/0052320 A1 Mar. 10, 2005

Related U.S. Application Data

(60) Provisional application No. 60/465,823, filed on Apr. 25, 2003.

(51) Int. Cl.
G01S 1/00 (2006.01)
G01S 5/14 (2006.01)

(52) U.S. Cl. ............... 342/357.09; 342/357.06; 342/357.15; 701/213

(58) Field of Classification Search ......... 342/357.01, 342/357.06, 357.09, 357.1, 457, 357.11; 701/207, 213, 215

See application file for complete search history.

(56) References Cited

U.S. PATENT DOCUMENTS

| | | | |
|---|---|---|---|
| 5,841,396 A * | 11/1998 | Krasner | 342/357.02 |
| 6,289,280 B1 * | 9/2001 | Fernandez-Corbaton et al. | 701/214 |
| 6,400,314 B1 * | 6/2002 | Krasner | 342/357.09 |
| 6,433,735 B1 * | 8/2002 | Bloebaum et al. | 342/357.1 |
| 6,441,778 B1 * | 8/2002 | Durst et al. | 342/357.07 |
| 6,518,919 B1 * | 2/2003 | Durst et al. | 342/357.07 |
| 6,760,582 B2 * | 7/2004 | Gaal | 455/423 |
| 6,999,776 B2 * | 2/2006 | Ogino et al. | 455/456.1 |
| 2002/0111171 A1 * | 8/2002 | Boesch et al. | 455/456 |
| 2002/0199196 A1 * | 12/2002 | Rabinowitz et al. | 725/72 |
| 2003/0006931 A1 * | 1/2003 | Mages | 342/357.06 |
| 2004/0072583 A1 * | 4/2004 | Weng | 455/456.3 |
| 2004/0077311 A1 * | 4/2004 | Riley | 455/12.1 |
| 2004/0160365 A1 * | 8/2004 | Riley et al. | 342/451 |
| 2004/0203853 A1 * | 10/2004 | Sheynblat | 455/456.1 |
| 2005/0192024 A1 * | 9/2005 | Sheynblat | 455/456.1 |
| 2006/0038719 A1 * | 2/2006 | Pande et al. | 342/357.12 |

OTHER PUBLICATIONS

International Search Report and Written Opinion based on PCT/US2004/012037.

* cited by examiner

*Primary Examiner*—Dao Phan
(74) *Attorney, Agent, or Firm*—Connolly Bove Lodge & Hutz LLP; Jeffrey W. Cluck

(57) ABSTRACT

A method and apparatus for locating a mobile communications device such as a cell phone includes apparatus for communicating with base stations and apparatus for communicating with satellites. Signals received from satellites and the base stations are combined to provide the necessary information to calculate the location of the mobile communications device.

27 Claims, 4 Drawing Sheets

WIRELESS NETWORK ASSISTED GPS SYSTEM

CROSS REFERENCE TO RELATED APPLICATIONS

This application claims the benefit of U.S. Provisional Patent Application No.: 60/465,823, entitled WIRELESS NETWORK ASSISTED GPS SYSTEM, filed Apr. 25, 2003, the entire disclosure of which is hereby incorporated by reference.

TECHNICAL FIELD OF THE INVENTION

The present invention relates to GPS technologies, and more particularly, to a hybrid GPS system in which positioning of a mobile unit is realized with the assistance of a wireless network.

BACKGROUND OF THE INVENTION

To determine the position of a mobile unit equipped with a GPS receiver, measurements of distance between the GPS receiver and GPS satellites are made at the receiver. In addition to the distance measurements, the time at which the GPS signals are transmitted from GPS satellites should be deduced from the distance measurements for correcting timing errors in the receiver.

Timing errors may be effectively solved by differential GPS (DGPS) technology, in which the correction information of the timing errors is provided from a stationary reference receiver, which uses its known position to calculate timing. This is a result of the facts that, if two receivers are fairly close to each other (compared to the satellites far away in the space), the satellite signals that reach both of the receivers will have traveled through virtually the same slice of atmosphere, and so will have virtually the same errors. There are numerous satellites "in sight" (GPS satellite constellation is designed such that four or more satellites can be seen simultaneously at any location on the surface of the earth), and the reference receiver has no way of knowing which of the many available satellites a moving receiver might be using to calculate its position, thus the reference receiver runs through all the visible satellites and computes each of their errors. Then it transmits the correction information to the moving receiver. The moving receivers get the complete list of errors and apply the corrections for the satellites they're using.

There are, however, several problems in current geolocation technologies. The power consumption at a GPS receiver is always one of the major concerns in view of the portability of the mobile unit. The more data processed at the receiver, the more profound the problem. Having a GPS receiver receive plural signals and then calculate its position requires extensive processing power.

Effective detection of the GPS signals is another issue, since there are numerous satellite signals in space. Furthermore, sometimes there are not enough satellite signals received at the receiver for position calculation purposes, typically when the signals from one or more satellites are blocked from reaching the receiver. This may happen, for example, when the mobile unit is in a subway or in a building. The present invention helps to solve or minimize the above problems.

SUMMARY OF THE INVENTION

In the present invention, the positioning of the GPS receiver in a mobile unit is assisted by a wireless network. In particular, the land based wireless network has its own source of GPS satellite data, which can be provided to the GPS receiver to assist the detection of the GPS signals. Furthermore, the position of the mobile unit is calculated by a location application processor in the wireless network, and the GPS receiver does not need to demodulate the ephemeris information from the received GPS signals, but only needs to decode and transmit a set of parameters (pseudo-ranging measurements and satellite ID) to the base station. Thus, the signal processing and power consumption at the mobile unit is minimized. Furthermore, the position location with partial GPS (p-GPS) is possible as the wireless network can help with timing and/or distance information.

DETAILED DESCRIPTION OF THE PREFERRED EMBODIMENT

Figure 1:
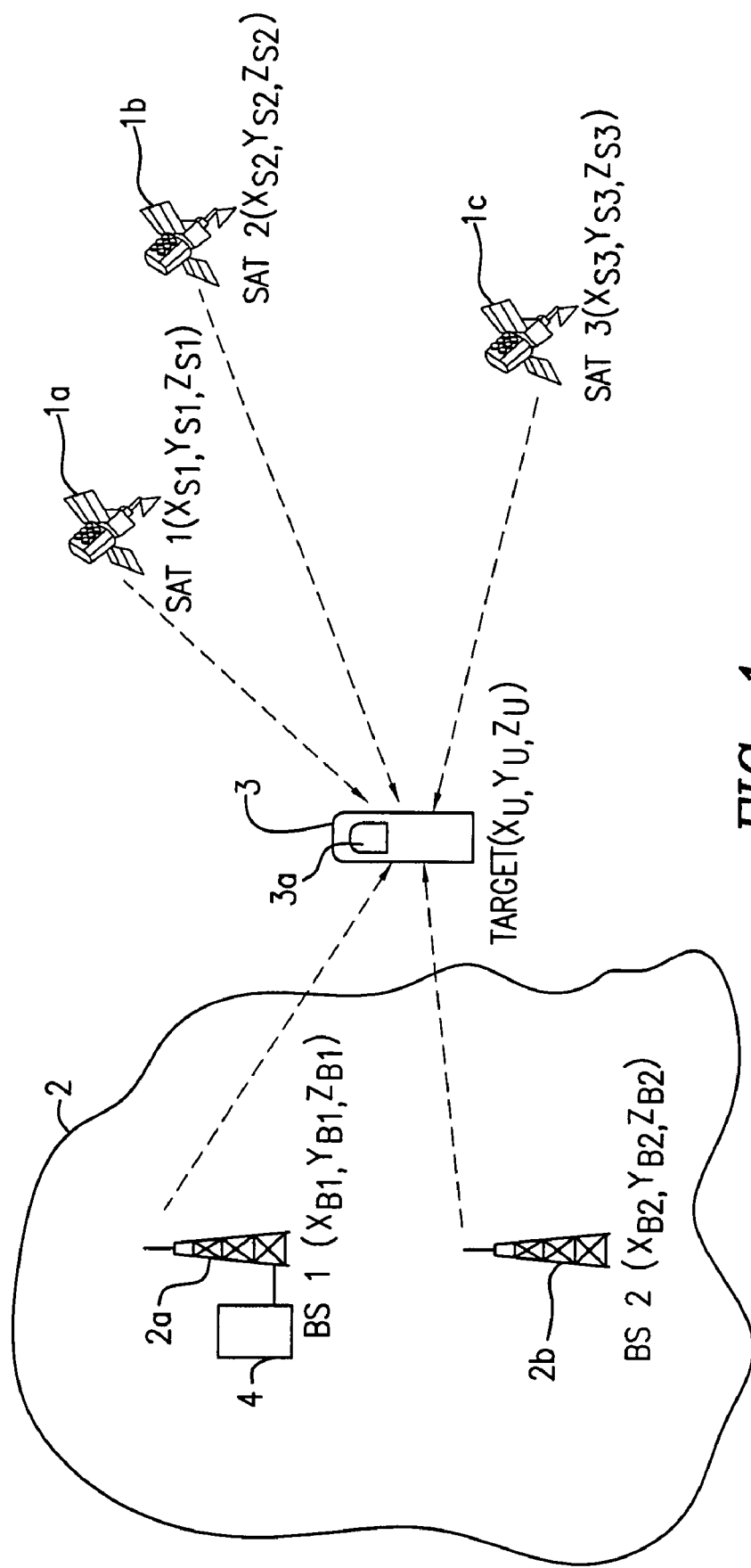
FIG. 1 illustrates of the present invention in which three satellites and two base stations of the wireless network are involved in the positioning of the mobile unit.

Reference is made to FIG. 1, in which two base stations 2a, 2b of the wireless network 2 and three of the satellites are involved in positioning of the targeted mobile unit 3 which is equipped with a GPS receiver 3a. With the base stations 1a, 1b, the wireless network 2 maintains communication with a plurality of available satellites in space and collects information from these satellites. Like a DGPS reference receiver, the wireless network may include timing errors for each satellite.

The GPS receiver 3a of the mobile unit 3 receives ephemeris data from the three satellites 1a, 1b and 1c, which are not blocked. According to the present invention, however, the ephemeris data does not need to be extensively processed at the mobile unit 3 because of the fact that the wireless network has its own source of GPS satellite data. The mobile unit 3 only needs to decode and transmit a set of GPS parameters (pseudo-ranging measurements and satellite ID) which is needed for the position calculation to a location application processor 4 provided in the wireless network 2, e.g., at the base station 2a.

The position calculation is carried out at the location application processor 4. Therefore, the signal processing and the computational power at the mobile unit 3 are minimized.

In addition to calculating the position of the GPS receiver 3a, the wireless network 2 can also assist the GPS receiver 3a in detection of the GPS signal. In particular, the wireless network 2 can predict what GPS signals the mobile unit 3 will be receiving at any given time and therefore can provide the information such as the Doppler shift experienced by the GPS signal and the PRN sequence that the mobile unit 3 should use to de-spread C/A signal from a particular satellite 1a, 1b or 1c as well as the information content carried by the GPS signal, the location and identity of the satellite(s)

providing the GPS signal, and any other relevant data. In this way, the detectability of the GPS signal at the mobile unit 3 is significantly enhanced, and the speed of such detection is maximized.

Furthermore, with the wireless network 2 and its base stations, the position location with partial GPS (p-GPS) is possible, as explained in detail below.

In order to determine the position in three dimensions and the GPS receiver clock error correction, pseudorange measurements are made to four satellites resulting in the system of equations:

$$\rho = \sqrt{(x_i - x_u)^2 + (y_i - y_u)^2 + (z_i - z_u)^2} + C \cdot t_u \quad (1)$$

where $\rho_i$=pseudorange from the receiver to satellite 'i';

$(x_i, y_i, z_i)$=coordinate of satellite 'i';

$(x_u, y_u, z_u)$=coordinate of the receiver to be calculated; and $t_u$=the receiver clock offset to be calculated.

The satellite clock drift and other delay elements are assumed to be adjusted and therefore not shown in the equation (1) above. The pseudorange is measured using the propagation delay of the signal transmitted from GPS satellites. The coordinates of the satellites are to be decoded from ephemeris data in the signal, and in the present invention, this can be carried out by the wireless network 2 instead of the mobile unit 3.

However, as shown in FIG. 1, only three satellites 1*a*, 1*b* and 1*c* are available to the GPS receiver 3*a* of the mobile unit 3. This may be caused by the fact that the mobile unit 3 is in a blocked location such as behind a building. With the signals sent from the three satellites 1*a*, 1*b* and c, three "GPS Equations" are as follows:

$$\rho_1 = \sqrt{(x_1 - x_u)^2 + (y_1 - y_u)^2 + (z_1 - z_u)^2} + C \cdot t_u$$

$$\rho_2 = \sqrt{(x_2 - x_u)^2 + (y_2 - y_u)^2 + (z_2 - z_u)^2} + C \cdot t_u \quad (2)$$

$$\rho_3 = \sqrt{(x_3 - x_u)^2 + (y_3 - y_u)^2 + (z_3 - z_u)^2} + C \cdot t_u$$

where $\rho_i$=pseudorange, the distance between target and satellite 'i'; and $t_u$=target's clock offset.

From the two base stations 2*a* and 2*b*, we have one "TDOA (time difference of arrival) Equation":

$$\delta_{BS2,BS1} = \sqrt{(x_{B2} - x_u)^2 + (y_{B2} - y_u)^2 + (z_{B2} - z_u)^2} -$$

$$\sqrt{(x_{B1} - x_u)^2 + (y_{B1} - y_u)^2 + (z_{B1} - z_u)^2} \quad (3)$$

where $\delta_{BS2,BS1}$=difference of distances between the target and base stations, which is measured at the target. (Notice that the TDOA equation do not have timing information assuming that the target's clock is not synchronized with the wireless network.)

Thus, we have the four non-linear equations with four unknowns, which are sufficient to calculate the position of the GPS receiver 3. The unknowns can be solved by employing closed form solution, iterative techniques based on linearization, or Kalman filtering.

Figure 2:
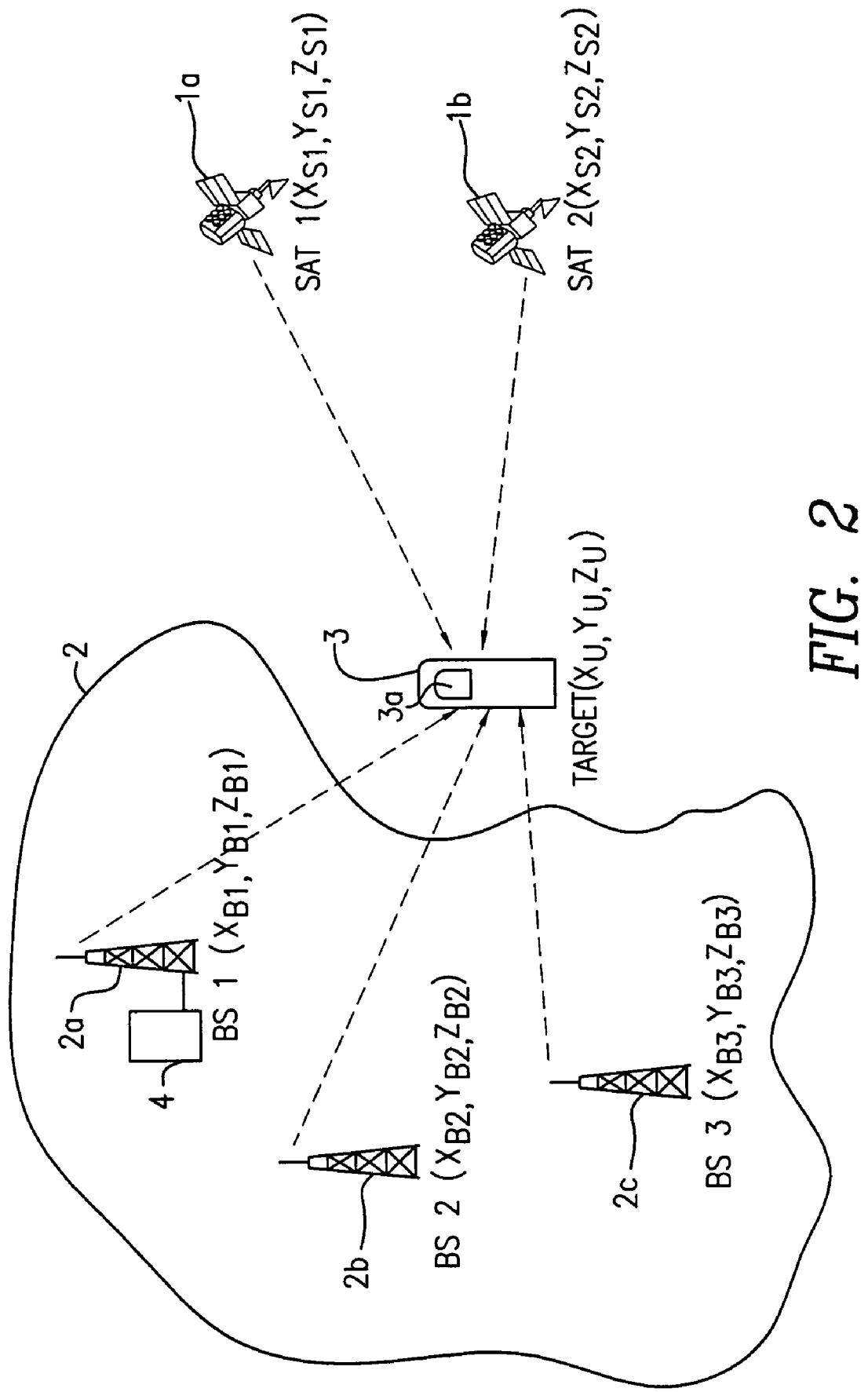
FIG. 2 illustrates of the present invention in which two satellites and three base stations of the wireless network are involved in the positioning of the mobile unit.

FIG. 2 shown another example where only two satellites 1*a*, 1*b* are available to the mobile unit 3, while three base stations 2*a*, 2*b*, 2*c* are involved in positioning the GPS receiver 3*a*. In this example, with the signals sent from the two satellites, two "GPS Equations" are:

$$\rho_1 = \sqrt{(x_{S1} - x_u)^2 + (y_{S1} - y_u)^2 + (z_{S1} - z_u)^2} + C \cdot t_u \quad (4)$$

$$\rho_2 = \sqrt{(x_{S2} - x_u)^2 + (y_{S2} - y_u)^2 + (z_{S2} - z_u)^2} + C \cdot t_u$$

where $\rho_i$=pseudorange, the distance between target and satellite 'i'

$t_u$=target's clock offset

From the three base stations, we have two "TDOA Equations":

$$\rho_{BS2,BS1} = \sqrt{(x_{B2} - x_u)^2 + (y_{B2} - y_u)^2 + (z_{B2} - z_u)^2} - \quad (5)$$

$$\sqrt{(x_{B1} - x_u)^2 + (y_{B1} - y_u)^2 + (z_{B1} - z_u)^2}$$

$$\rho_{BS3,BS1} = \sqrt{(x_{B3} - x_u)^2 + (y_{B3} - y_u)^2 + (z_{B3} - z_u)^2} -$$

$$\sqrt{(x_{B1} - x_u)^2 + (y_{B1} - y_u)^2 + (z_{B1} - z_u)^2}$$

where $\delta_{BSi,BSj}$=difference of distance between target and base station.

Thus, we have four equations for the four unknowns, which are sufficient for the positional calculation of the GPS receiver 3*a*.

According to the present invention, the insufficiency in GPS satellite signals can be supported by the information provided from one or more base stations of the wireless network 2, which may include timing information and distance information.

Basically, there are four degrees in terms of the assistance from the wireless network 3:

First degree: support is timing information from a base station of the wireless network 2. For this degree, three satellites are needed for acquiring a full set of four equations.

Second degree: support is timing information with distance information from a base station (distance from one base station to the target mobile unit). For this degree, two satellites are needed for acquiring a full set of four equations.

Third degree: support is timing information with distance information from two base stations (distance from each base station to the target mobile unit). For this degree, one satellite is needed for acquiring a full set of four equations.

Fourth degree: support is timing information with distance information from three base stations (distance from each base station to the target mobile unit). For this degree, no satellite is needed, and the positioning of the mobile unit 3 can be carried out solely by the wireless network 3.

Figure 3:
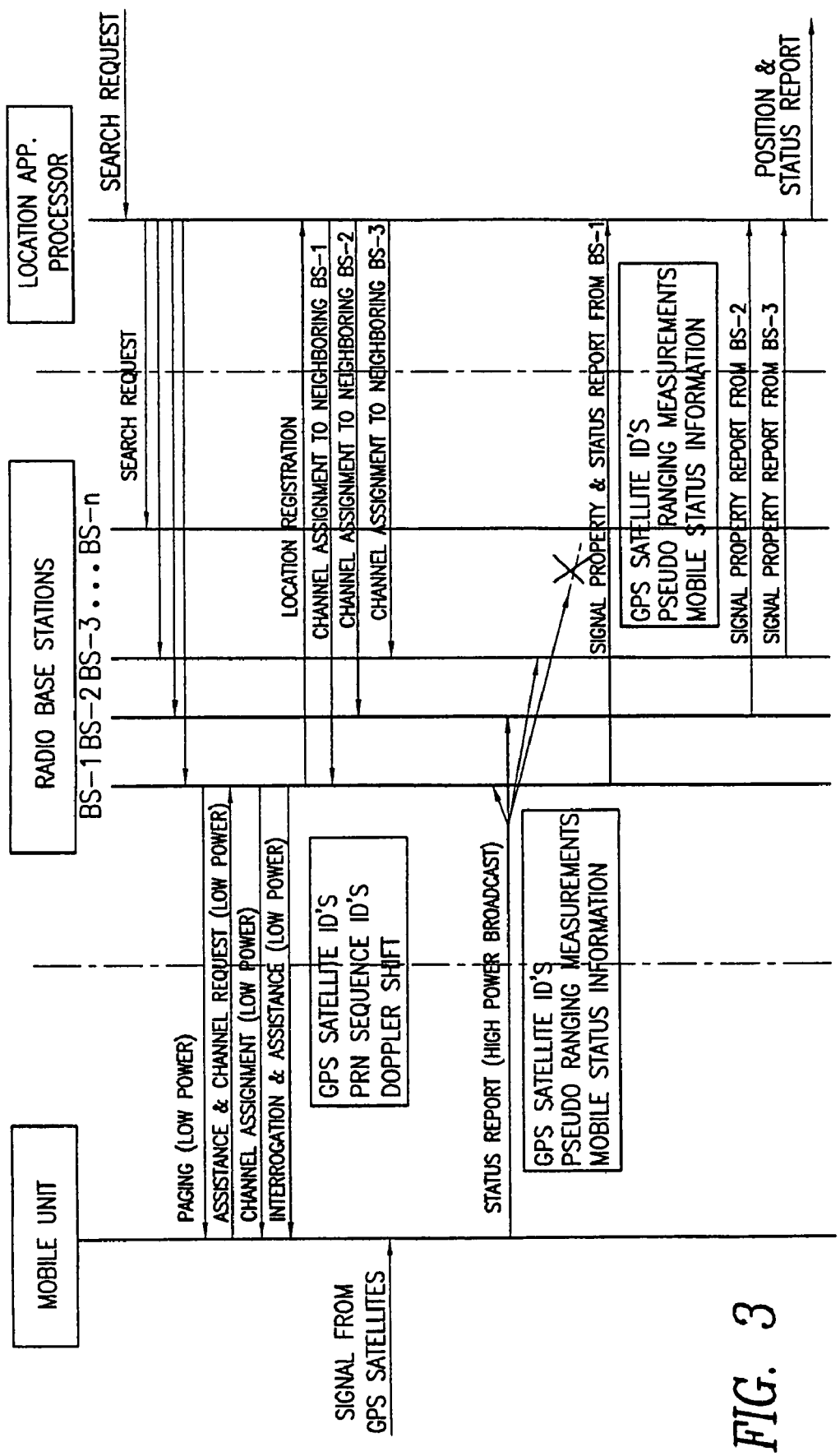
FIG. 3 illustrates an interrogation scenario of the present invention.

FIG. 3 illustrates a scenario of interrogation where the wireless network 2 initiates a query to locate the mobile unit 3. To start, the wireless network 2 sends a query message to the mobile unit 3, asking for the mobile's current status and the pseudo-range measurements from GPS signals. Importantly, the query message contains the information for assisting in the detection of the signals from GPS satellites such as Doppler shift and PRN sequence. In response, the GPS receiver 3*a* of the mobile unit 3 detects the proper satellites for the GPS signals and sends a set of GPS parameters, as well as status information of the mobile unit 3, back to the base stations of the wireless network 2 for the position calculation processor 4 to determine the position of the mobile unit 3.

Figure 4:
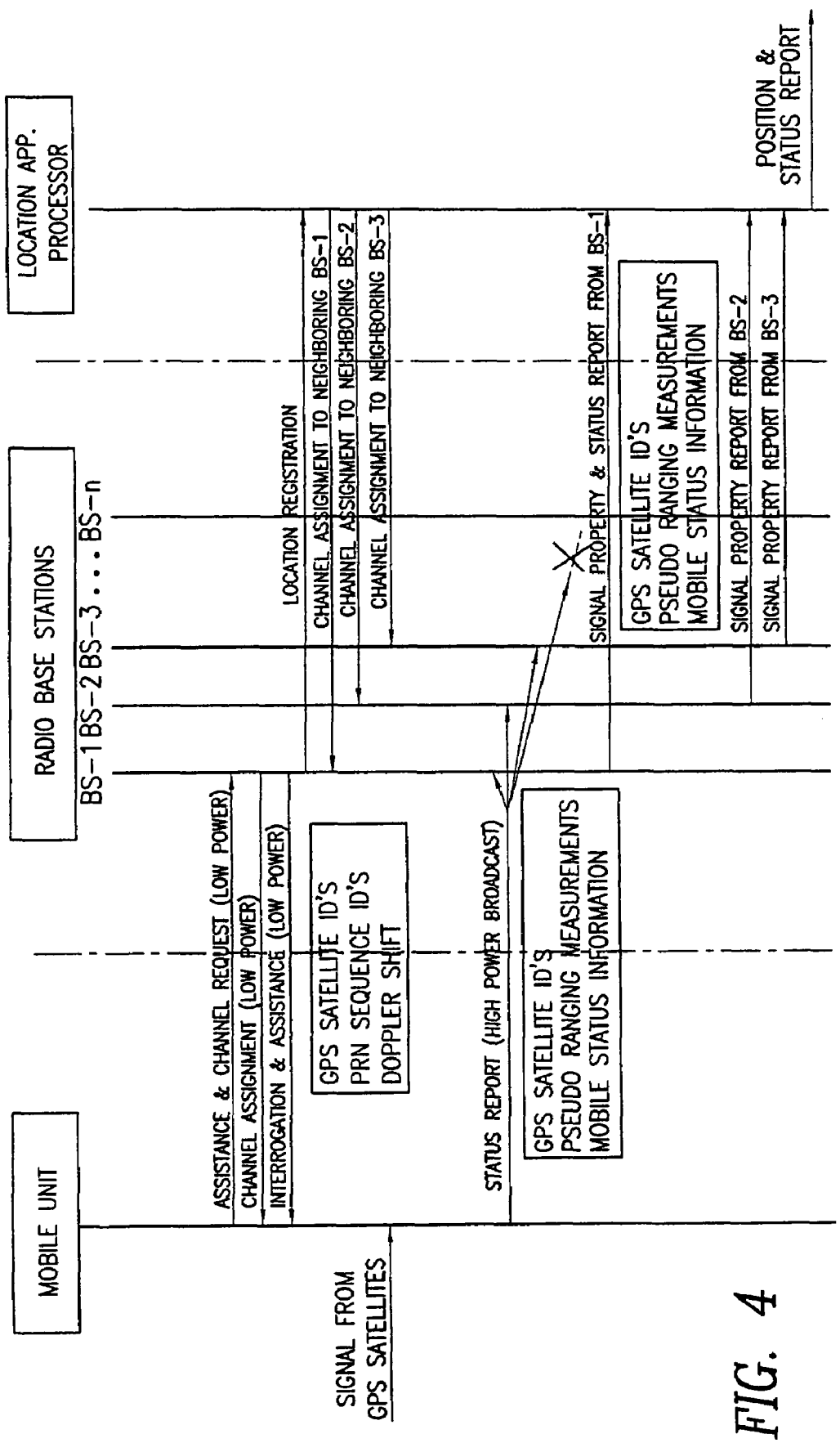
FIG. 4 illustrates a status report scenario of the present invention.

FIG. 4 illustrates a scenario of an assistance request initiated by the mobile unit 3. To start, the mobile unit 3 that needs to determine its position using GPS sends an assistance request message to a nearby base station, asking for the information for assisting in the detection of the signals from GPS satellites. Upon receiving the assistance request from the mobile unit 3, the wireless network 3 provides the information assisting the detection of the signals from GPS satellites. With the detection assistance information provided by the wireless network, the mobile unit 3 will be able to more easily detect the GPS signals from the proper satellites. Again, the pseudo-measurements from the GPS receiver along with the status information of the mobile unit 3 are transmitted to base stations.

Notably, the assistance request message may itself reach plural base stations, each of which provides information. The difference in arrival times of the information can itself be utilized as yet further information in detecting the position of the GPS receiver, which further information may be combined with the use of the satellite data that is at least partially specified in the information.

A status report signal received at multiple base stations may also be used to determine the position of the mobile unit 3, using TOA, TDOA and/or AOA. Base stations determine the received signal properties (e.g., signal propagation delay in case of TOA) that are relevant in determining the position of the mobile unit 3, and forward these signal properties along with the GPS pseudo-ranging measurement data contained in the status report message to the location application processor where the final position calculation is carried out.

It is also possible that the mobile unit 3 calculates the position by itself, but more power will be consumed at the mobile unit due to more signal processing requirement.

In general, there are in fact at least three types of information that may be utilized to assist in locating the GPS receiver. First, the difference in path lengths of plural signals sent from different based stations to the GPS receiver. Second, the difference in lengths of signals sent to/from satellites from/to the GPS receiver. Third, the difference in path length of one or more signals sent from the GPS receiver to plural base stations. These three signals can be combined using known mathematical equations to locate the GPS receiver with in a more accurate fashion than was previously possible.

The invention claimed is:

1. A method of locating a mobile communications device, the method comprising:
   receiving GPS data from a base station at said mobile communications device, and
   sending the data from said mobile communications device to an applications processor,
   wherein the applications processor is adapted to calculate the location of the mobile communications device based upon said data sent from said base station in combination with GPS data not sent from said base station, and
   wherein said mobile communications device receives from said base station information identifying specific satellites to be used for location of said mobile communications device.

2. The method of claim 1, wherein said base station is part of a wireless network, and wherein the method further comprises:
   receiving from said base station information that is used by the mobile communications device to either determine how to encode information to be sent to at least one satellite or to determine how to decode information received from at least one satellite.

3. A method of locating a mobile communications device, the method comprising:
   receiving by the mobile communications device first information from base stations and second information from one or more satellites, and
   combining such information in a manner to locate said device,
   wherein the mobile device first transmits to at least one base station a request that the base station provide the mobile device with third information needed to obtain the second information from the satellites, and wherein the mobile communications device uses said first and second information to ascertain its location.

4. The method of claim 3, wherein plural satellites and a single base station are utilized.

5. A method of locating a mobile device comprising:
   transmitting an instruction to a mobile device to instruct the mobile device to receive signals from one or more particular satellites, wherein said signals received from said satellites are to be used to locate said device.

6. The method of claim 5, wherein said transmitting is from a land-based wireless network.

7. The method of claim 6, wherein said transmitting further includes:
   transmitting information to be combined with said signals received from one or more satellites to assist in locating said device, whereby said device is located based upon distances to satellites and distances to base stations.

8. The method of claim 7, wherein said transmitting also includes:
   transmitting one or more codes to be used to de-spread information from one or more of said particular satellites.

9. Apparatus for use with a mobile communications device, said apparatus for locating said mobile communications device, said apparatus comprising:
   a transmitter to transmit a request to a base station,
   a receiver to receive information from said base station in response to said request, said information being of assistance in locating said mobile communications device, and
   a second receiver to receive information from satellites to assist in locating said mobile communications device,
   wherein said mobile communications device is to receive, in response to a request from said mobile communications device, a numerical sequence or identification of said numerical sequence to be used by said mobile communications device in de-spreading or decoding information to be received from at least one satellite.

10. The apparatus of claim 9, wherein said received information is to be sent to an applications processor for calculation of said location.

11. The apparatus of claim 10, wherein said received information is to be sent to said applications processor in combination with other received information from base stations, and wherein said location of said mobile communications device is to be determined based upon said received information and said other received information.

12. The apparatus of claim 11, wherein said transmitter is to transmit the request to plural base stations.

13. The apparatus of claim 12, wherein said information is to be received by said mobile communication device from said plural base stations, and wherein a difference in arrival time of said information from said plural base stations is to be used in part to locate said mobile communications device.

14. The apparatus of claim 13, wherein said difference in arrival time is to be combined with information received from satellites to locate said mobile communications device.

15. A method of locating a mobile device, said method comprising:
receiving, from one or more base stations, first information to said mobile device, and
utilizing at said mobile device said first information to assist said mobile device in acquiring second information from at least one satellite to facilitate locating said mobile device, wherein additional information from at least one base station is to be used in combination with said second information to locate said device.

16. The method of claim 15, further comprising:
transmitting said second information acquired from said at least one satellite to a base station, to be used by said base station in combination with either said first information or other information derived from communications between said mobile device and said base station, to locate said mobile device.

17. The method of claim 15, wherein said first information includes at least one item of information selected from the group consisting of identification of at least one satellite with which said mobile device should communicate, a de-spreading sequence or de-spreading sequence identification, or a decoding sequence or decoding sequence identification.

18. A method of locating a mobile communications device, the method comprising:
sending GPS data from a base station to said mobile communications device,
receiving the GPS data from said mobile communications device at an applications processor, and
calculating, at the applications processor, a location of the mobile communications device based upon said GPS data sent from said base station in combination with GPS data not sent from said base station, and
wherein said base station sends to said mobile communications device information identifying specific satellites to be used for location of said mobile communications device.

19. The method of claim 18, wherein said base station is part of a wireless network, and wherein the method further comprises:
transmitting from said base station to said mobile communications device information that is to be used by the mobile communications device to either determine how to encode information to be sent to at least one satellite or to determine how to decode information received from at least one satellite.

20. A method of locating a mobile device, said method comprising:
transmitting, from one or more base stations, first information to said mobile device, said first information to be utilized at said mobile device to assist said mobile device in acquiring second information from at least one satellite to facilitate locating said mobile device,
wherein additional information from at least one base station is to be used in combination with said second information to locate said device.

21. The method of claim 20, further comprising:
receiving at a base station said second information acquired from said at least one satellite, and
using said second information acquired from said at least one satellite in combination with either said first information or other information derived from communications between said mobile device and said base station to locate said mobile device.

22. The method of claim 20, wherein said first information includes at least one item of information selected from the group consisting of identification of at least one satellite with which said mobile device should communicate, a de-spreading sequence or de-spreading sequence identification, or a decoding sequence or decoding sequence identification.

23. A wireless communication system to locate a mobile communication device, the system comprising:
one or more base stations, at least one base station to transmit first information to said mobile communication device, said first information including timing information from at least one base station; and
an applications processor to receive second information from said mobile communication device and to use at least said second information to locate said mobile communication device, wherein said second information includes at least one item of information selected from the group consisting of:
said first information; and
information obtained using at Least one satellite; and
wherein, if said information includes said first information, the applications processor uses at least one item of further information in combination with said first information to locate said mobile communication device.

24. The system according to claim 23, wherein said first information includes at least one item of information selected from the group consisting of:
distance information between at least one base station and said mobile communication device;
timing information; and
information obtained by at least one base station using at least one satellite.

25. The system according to claim 23, wherein said information obtained using at least one satellite comprises information obtained by said mobile communication device using at least one satellite.

26. The system according to claim 23, wherein said first information includes at least one item of information selected from the group consisting of:
information to instruct said mobile communication device to utilize at least one particular satellite;
a de-spreading sequence;
a de-spreading sequence identifier;
a decoding sequence; and
a decoding sequence identifier.

27. The system according to claim 23, wherein said applications processor is further to receive additional information from at least one base station to be used to locate said mobile communication device.

* * * * *